Jan. 31, 1961

LA VERNE B. RAGSDALE 2,970,015

CAGE AND BEARING ASSEMBLY FOR SEAT
ADJUSTER SLIDE STRUCTURES

Filed April 24, 1957

INVENTOR.
LaVerne B. Ragsdale
BY
W. S. Pettigrew
ATTORNEY

United States Patent Office 2,970,015
Patented Jan. 31, 1961

2,970,015

CAGE AND BEARING ASSEMBLY FOR SEAT ADJUSTER SLIDE STRUCTURES

La Verne B. Ragsdale, Dearborn, Mich., assignor to General Motors Corporation, Detroit, Mich., a corporation of Delaware Filed Apr. 24, 1957, Ser. No. 654,774

2 Claims. (Cl. 308—6)

This invention relates generally to seat adjusting mechanisms, and more particularly to a cage and bearing assembly for a seat adjuster slide structure.

The cage and bearing assembly of this invention is particularly intended for use with seat adjuster slide structures which include a pair of track members having opposed spaced base walls and pairs of spaced opposed terminal flanges. The cage includes a base wall positioned between the base walls of the tracks and provided with an elongated opening which freely receives a roller bearing engageable with the base walls of the tracks to vertically space the tracks with respect to each other and locate the opposed terminal flanges of the tracks in spaced relationship. A laterally extending wall at either side of the base wall of the cage terminates in a generally closed bead structure located between the spaced opposed terminal flanges of the tracks. Each of the bead structures is intermediately slotted and a ball bearing has opposed spherical segmental portions thereof freely and rotatably received within the openings of each bead structure to either side of the slots so that the balls project beyond the bead structure on opposite sides thereof and into engagement with the terminal flanges of the tracks to slidably support one upon the other. The cage is a unitary rigid member and is relatively simple in construction, but adequately performs the dual function of locating the roller bearing between the tracks and locating and rotatably supporting the ball bearings between the tracks.

The primary object of this invention is to provide new and improved cage and bearing assembly for seat adjuster slide structures. Another object of this invention is to provide a cage and bearing assembly for seat adjuster slide structure which locates and rotatably supports a number of spaced ball bearings between the tracks of the slide structure to provide an anti-friction means therebetween. A further object of this invention is to provide a cage and bearing assembly for the tracks of a seat adjuster slide structure which provides a locating means for a roller bearing spacing the tracks and a supporting and locating means for a number of ball bearings which slidably support one track upon the other.

These and other objects of this invention will be readily apparent from the following specification and drawings, wherein.

Figure 1:
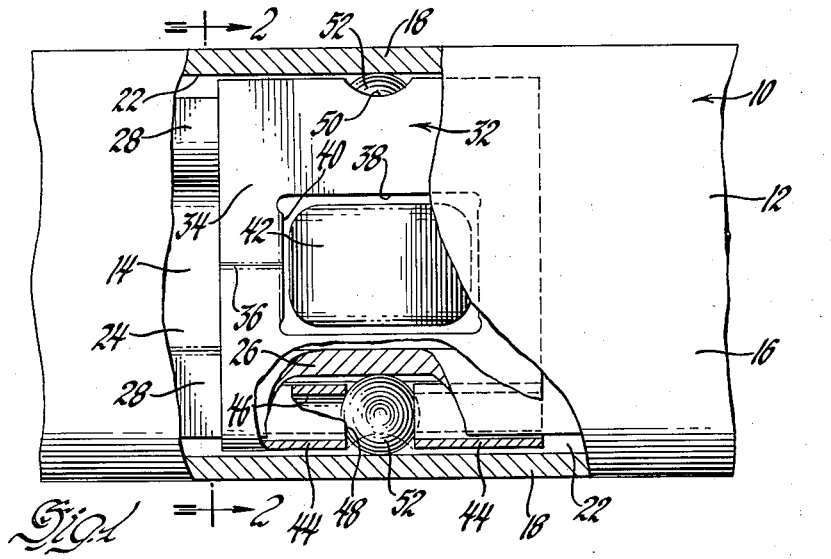
Figure 1 is a partial top plan view of a seat adjuster slide structure embodying a cage and bearing assembly according to this invention, with parts thereof broken away for clarity of illustration.
Figure 2:
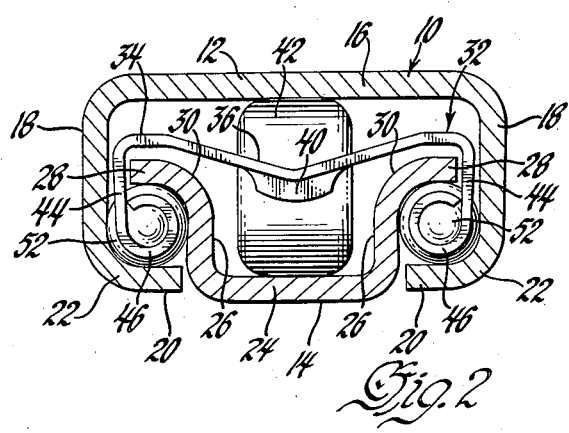
Figure 2 is a sectional view taken on the plane indicated by line 2—2 of Figure 1.

Referring now particularly to Figures 1 and 2 of the drawings, a seat adjuster slide structure 10 includes an upper track 12 and a lower track 14. The upper track includes a base wall 16 and a pair of laterally extending side walls 18 which terminate in laterally extending flanges 20 joined to the side walls 18 on arcuate shoulders 22. The lower track 14 includes a base wall 24 freely slidable within the opening defined by flanges 20, and a pair of laterally extending side walls 26 located in generally parallel opposed relationship to the side walls 18 of the upper track 12 and terminating in laterally extending flanges 28 which are joined to walls 26 on arcuate shoulders 30 and which are located in generally parallel opposed relationship to the flanges 20.

In the usual seat adjuster slide structure, the lower track 14 is scured to a fixed base or other support and the upper track 12 is usually secured to the seat so as to slidably support the seat on the fixed base for horizontal adjustment relative thereto. A latch mechanism or otherwise may be provided between the tracks to hold the tracks in adjusted relationship. Since the latch mechanism per se forms no part of this invention, the further details thereof are not necessary to an understanding of the invention, and accordingly will not be given.

Figure 3:
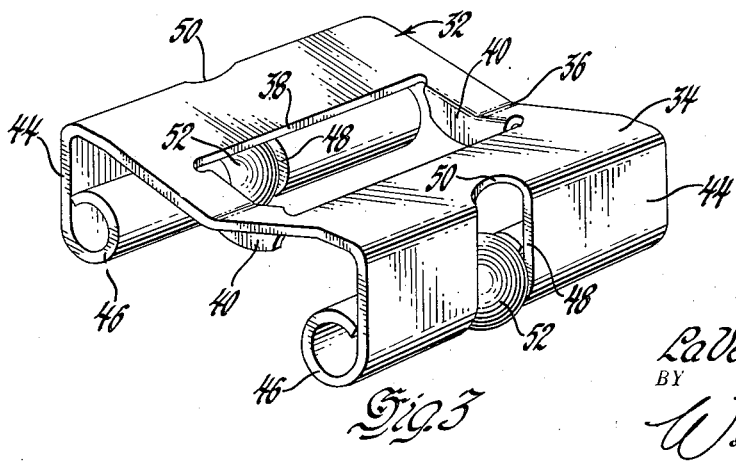
Figure 3 is a perspective view of the cage and bearing assembly.

A cage 32 fits between the upper and lower tracks as may be best seen in Figure 2. The cage includes a base wall 34 having an intermediate generally V-shaped portion 36. An elongated longitudinally extending opening 38 is provided in the portion 36 and the longitudinal axis of the opening lies in a plane containing the apex of the V-shaped portion. A depending flange 40 is provided at opposite transverse sides of the opening 38 as may be best seen in Figure 3.

Referring now particularly to Figure 2 of the drawings, a roller bearing 42 is freely receivable within the opening 38 and bears against the base walls 16 and 24 of the upper and lower tracks 12 and 14, respectively, so as to laterally and vertitcally locate the tracks and also to locate the flanges 20 and 28 thereof in generally parallel spaced relationship as shown. During movement of the upper track relative to the lower track, the roller bearing 42 rotates about its axis which is transverse of the opening 38 and may come into engagement with either of the depending flanges 40 at the opposite transverse sides of the opening 38. By providing the base wall 34 with the generally V-shaped intermediate portion 36 and by further providing the depending flanges 40, the area of engagement of the roller bearing with either of the flanges 40 will generally lie within a plane generally containing the axis of rotation of the roller bearing so that there will be no tendency for the roller bearing to bias the cage angularly with respect to the tracks from its normal position as shown. Thus, if the base wall 34 of the cage were planar, then the area of engagement of the roller bearing with opposite transverse sides of the opening would lie in a plane above its axis of rotation and further rotation of the roller bearing while in engagement with either of the opposite sides would tend to bias the cage angularly with respect to the tracks.

The base wall 34 of the cage is provided with a spaced pair of laterally extending or depending side walls 44 which fit between the terminal flanges 28 of the lower track and the side walls 18 of the upper track. Each of the side walls 44 terminates in a generally closed inwardly beaded structure 46 which is located between the opposed side walls 18 and 26 and the opposed terminal flanges 20 and 28 of the upper and lower tracks, respectively. As may be seen best in Figures 1 and 3 of the drawings, each of the beaded structures 46 is slotted at 48 intermediately and transversely thereof, with each slot 48 extending partially into the base wall 34 of the cage at 50. A ball bearing 52 has opposite spherical segmental portions thereof received within the windings of each of the beaded structures to opposite sides of each slot 48. The ball bearings have a diameter greater than the diameter of the beaded structures so that they project outwardly of the beaded structures and into engagement with the arcuate shoulders 22 and 30 of the upper and lower tracks 12 and 14, respecttively, to slidably support the upper track on the lower track and also to locate the tracks laterally and horizontally of each other. The width of each of the slots 48 is made slightly greater than the distance between the planes of the spherical segments of each ball bearing which are received within the openings of the beaded structures to either side of the slots 48. Thus, the ball bearings are rotatably mounted on the cage and also have a slight degree of bodily movement with respect thereto. By providing this slight degree of bodily movement, the ball bearings may be fitted within any pair of tracks without having any engagement between the cage and either of the tracks.

It will also be noted that the ball bearings 52 mount the cage on the upper and lower tracks for pivotal movement about an axis through the centers of the ball bearings and transverse of the tracks and the cage. This axis is also coplanar with the axis of the roller bearing 42. Since the ball bearings so mount the cage, the generally V-shaped intermediate portion 36 of the base wall 34 and the flanges 40 are particularly important as previously pointed out.

It will be understood that suitable stops are provided on the base walls 16 and 24 of the upper and lower tracks, respectively, in order to limit the movement of the roller bearing 42 as the tracks move relative to each other. No stops are provided for the ball bearings 52 as is well known.

Thus, this invention provides a new and improved cage and bearing assembly for seat adjuster slide structures.

I claim:

1. A cage and bearing assembly comprising, a cage having a base wall provided with an elongated opening therein for freely receiving a roller bearing, a laterally extending wall at opposite sides of said base wall terminating in a generally closed bead structure, each of said bead structures being slotted transversely thereof to provide pairs of spaced opposed openings, and a ball bearing having segmental portions thereof freely receivable within said pairs of spaced opposed openings for rotatably mounting and locating said ball bearings on said cage, said pairs of openings being spaced apart with respect to each other a distance greater than the distance between planes defining the segmental portions of said ball bearings whereby said ball bearings are permitted a slight degree of bodily shifting movement with respect to said cage both laterally and longitudinally thereof.

2. A cage and bearing assembly, comprising, a cage having a base wall provided with an elongated opening therein for receiving a roller bearing, a laterally extending wall at opposite sides of said base wall terminating in a generally closed bead structure, each of said walls and said bead structures being slotted transversely thereof to provide pairs of spaced opposed openings in each of said bead structures, said slots extending partially into said base wall adjacent each of said laterally extending walls, and a ball bearing having segmental portions thereof freely receivable within said pairs of spaced opposed openings for rotatably mounting and locating said ball bearings on said cage, each of said pairs of openings being spaced apart with respect to each other a distance greater than the distance between planes defining the segmental portions of said ball bearings whereby said ball bearings are permitted a slight degree of bodily shifting movement with respect to said cage both longitudinally and laterally thereof.

References Cited in the file of this patent

UNITED STATES PATENTS

| 2,612,208 | Rhodes | Sept. 30, 1952 |
| 2,723,711 | Duncan | Nov. 15, 1955 |
| 2,753,947 | Mach | July 10, 1956 |

FOREIGN PATENTS

| 647,976 | Great Britain | Dec. 28, 1950 |
| 725,218 | Great Britain | Mar. 2, 1955 |

UNITED STATES PATENT OFFICE
CERTIFICATION OF CORRECTION

Patent No. 2,970,015                      January 31, 1961

La Verne B. Ragsdale

It is hereby certified that error appears in the above numbered patent requiring correction and that the said Letters Patent should read as corrected below.

Column 2, line 34, for "vertitcally" read --- vertically ---; line 70, for "windings" read --- openings ---; column 3, line 3, for "respecttively" read --- respectively ---.

Signed and sealed this 5th day of September 1961.

(SEAL)
Attest:

ERNEST W. SWIDER                      DAVID L. LADD

Attesting Officer                       Commissioner of Patents